United States Patent
Donderici et al.

(10) Patent No.: US 9,897,715 B2
(45) Date of Patent: Feb. 20, 2018

(54) MULTI-AXIAL INDUCTION BOREHOLE IMAGER

(75) Inventors: Burkay Donderici, Houston, TX (US); Ferhat T. Celepcikay, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 303 days.

(21) Appl. No.: 14/411,497

(22) PCT Filed: Jun. 29, 2012

(86) PCT No.: PCT/US2012/044945
§ 371 (c)(1),
(2), (4) Date: Dec. 27, 2014

(87) PCT Pub. No.: WO2014/003786
PCT Pub. Date: Jan. 3, 2014

(65) Prior Publication Data
US 2015/0153474 A1 Jun. 4, 2015

(51) Int. Cl.
*G01V 3/12* (2006.01)
*G01V 3/26* (2006.01)
(Continued)

(52) U.S. Cl.
CPC ............ *G01V 3/38* (2013.01); *E21B 47/122* (2013.01); *G01V 3/108* (2013.01); *G01V 3/28* (2013.01)

(58) Field of Classification Search
CPC ... G01V 3/12; G01V 3/26; G01V 3/28; G01V 3/30; G01V 3/38; E21B 47/12; E21B 47/122
(Continued)

(56) References Cited

U.S. PATENT DOCUMENTS 2,617,852 A  11/1952 Waters
4,264,862 A  4/1981 Koelle et al.
(Continued)

FOREIGN PATENT DOCUMENTS

WO  2011/090656  7/2011
WO  2011/091216  7/2011
(Continued)

OTHER PUBLICATIONS

PCT International Search Report and Written Opinion, dated Sep. 24, 2012, Appl No. PCT/US2012/044945, "Multi-Axial Induction Borehole Imager", filed Jun. 29, 2012, 9 pgs.
(Continued)

*Primary Examiner* — Arleen M Vazquez
*Assistant Examiner* — Neel Shah
(74) *Attorney, Agent, or Firm* — Benjamin Fite; Tumey L.L.P.

(57) ABSTRACT

Various systems and methods are disclosed for implementing and using a multi-axial induction borehole imaging tool that includes emitters that induce, at azimuthally-spaced positions on a borehole wall, a plurality of fields having components in three non-coplanar directions within a formation. The tool also includes directionally sensitive inductive sensors that sense the components caused by each of the one or more inductive emitters, and a downhole controller that processes signals received from the directionally sensitive inductive sensors to provide a set of measurements representative of an impedance tensor at each position.

21 Claims, 11 Drawing Sheets

(51) Int. Cl.
*G01V 3/28* (2006.01)
*G01V 3/30* (2006.01)
*G01V 3/38* (2006.01)
*E21B 47/12* (2012.01)
*G01V 3/10* (2006.01)

(58) Field of Classification Search
USPC .............. 324/332–343, 347, 355–356; 702/7; 175/45, 50
See application file for complete search history.

(56) References Cited

U.S. PATENT DOCUMENTS

| | | | |
|---|---|---|---|
| 5,331,604 A * | 7/1994 | Chang | G01V 1/44 367/31 |
| 6,191,588 B1 | 2/2001 | Chen | |
| 6,794,875 B2 | 9/2004 | Strickland | |
| 6,934,635 B2 | 8/2005 | Kennedy | |
| 6,957,708 B2 * | 10/2005 | Chemali | E21B 17/1078 175/50 |
| 7,299,131 B2 | 11/2007 | Tabarovsky et al. | |
| 7,365,545 B2 | 4/2008 | Itskovich et al. | |
| 7,545,145 B2 | 6/2009 | Wang | |
| 7,876,102 B2 | 1/2011 | Gold et al. | |
| 8,129,994 B2 | 3/2012 | Wang | |
| 8,200,437 B2 | 6/2012 | Davydycheva et al. | |
| 8,358,414 B2 | 1/2013 | Csutak | |
| 2002/0062992 A1 | 5/2002 | Fredericks | |
| 2003/0051914 A1 * | 3/2003 | Bittar | G01V 3/30 175/45 |
| 2005/0001624 A1 | 1/2005 | Ritter | |
| 2005/0104587 A1 | 5/2005 | Akkurt | |
| 2005/0256645 A1 | 11/2005 | Rabinovich et al. | |
| 2005/0274512 A1 | 12/2005 | Tabarovsky et al. | |
| 2006/0031017 A1 | 2/2006 | Mathieu et al. | |
| 2007/0035306 A1 | 2/2007 | Forgang et al. | |
| 2007/0061082 A1 | 3/2007 | Seleznev et al. | |
| 2008/0033654 A1 | 2/2008 | Bespalov et al. | |
| 2008/0290873 A1 * | 11/2008 | Homan | G01V 3/30 324/337 |
| 2009/0309602 A1 | 12/2009 | Wang | |
| 2010/0073189 A1 | 3/2010 | Mandal et al. | |
| 2010/0156424 A1 | 6/2010 | Bittar et al. | |
| 2010/0198569 A1 * | 8/2010 | Wu | G01V 3/38 703/6 |
| 2010/0220324 A1 | 9/2010 | Csutak | |
| 2011/0001481 A1 | 1/2011 | Forgang et al. | |
| 2011/0019500 A1 | 1/2011 | Plyushchenkov et al. | |
| 2011/0025336 A1 | 2/2011 | Forgang et al. | |
| 2011/0075951 A1 | 3/2011 | Tseng | |
| 2011/0089951 A1 | 4/2011 | Wang | |
| 2011/0251794 A1 | 10/2011 | Bittar et al. | |
| 2011/0254552 A1 | 10/2011 | Wu et al. | |
| 2012/0033525 A1 | 2/2012 | Abma et al. | |
| 2012/0075951 A1 | 3/2012 | Johnson et al. | |
| 2012/0111561 A1 | 5/2012 | Frey et al. | |
| 2013/0048379 A1 | 2/2013 | MacDonald et al. | |
| 2013/0151157 A1 | 6/2013 | Brooks et al. | |
| 2014/0056111 A1 | 2/2014 | Vu et al. | |
| 2014/0368197 A1 * | 12/2014 | Wang | G01V 3/12 324/333 |
| 2015/0160365 A1 | 6/2015 | Donderici et al. | |

FOREIGN PATENT DOCUMENTS

| | | |
|---|---|---|
| WO | 2012/087305 | 6/2012 |
| WO | 2014/003784 | 1/2014 |
| WO | 2014/003786 | 1/2014 |

OTHER PUBLICATIONS

PCT International Search Report and Written Opinion, dated Sep. 11, 2012, Appl No. PCT/US2012/044931, "Full Tensor Micro-Impedance Imaging", filed Jun. 29, 2012, 9 pgs.

Moinfar, Ali et al., "Time-Lapse Variations of Multi-Component Electrical Resistivity Measurements Acquired in High-Angle Wells", Petrophysics, vol. 51, No. 6, Dec. 2010, p. 408-427, 21 Figures, 4 Tables, 20 pgs.

PCT International Preliminary Report on Patentability, dated Jun. 10, 2014, Appl No. PCT/US2012/044931, "Full Tensor Micro-Impedance Imaging," filed Jun. 29, 2012, 14 pgs.

PCT International Preliminary Report on Patentability, dated Jul. 15, 2014, Appl No. PCT/US2012/044945, "Multi-Axial Induction Borehole Imager," Filed Jun. 29, 2012, 17 pgs.

AU Patent Examination Report, dated Oct. 7, 2016, Appl No. 2016203759, "Full Tensor Micro-Impedance Imaging," Filed Jun. 29, 2012, 3 pgs.

AU Patent Examination Report, dated Jun. 5, 2015, Appl No. 2012383487, "Full Tensor Micro-Impedance Imaging," Filed Jun. 29, 2012, 3 pgs.

U.S. Final Office Action, dated Dec. 1, 2015, U.S. Appl. No. 14/411,500, "Full Tensor Micro-Impedance Imaging," filed Dec. 27, 2014, 30 pgs.

U.S. Final Office Action, dated Dec. 20, 2016, U.S. Appl. No. 14/411,500, "Full Tensor Micro-Impedance Imaging," filed Dec. 27, 2014, 30 pgs.

U.S. Non-Final Office Action, dated Jul. 14, 2015, U.S. Appl. No. 14/411,500, "Full Tensor Micro-Impedance Imaging," filed Dec. 27, 2014, 28 pgs.

GCC Examination Report, dated Aug. 21, 2016, Appl No. 24213, "Full Tensor Micro-Impedance Imaging," Filed Apr. 27, 2013, 5 pgs.

GCC Examination Report, dated Jul. 20, 2016, Appl No. 24168, "Multi-Axial Induction Borehole Imager," Filed Apr. 23, 2013, 7 pgs.

CA Emaminer's Requisition, dated Feb. 12, 2016, Appl No. 2,875,951, "Multi-Axial Induction Borehole Imager," filed Jun. 29, 2012, 13 pgs.

EP Extended Search Report, dated Oct. 20, 2015, Appl No. 12880162.8, "Full Tensor Micro-Impedance Imaging," filed Dec. 27, 2014, 8 pgs.

EP Extended Search Report, dated Oct. 20, 2015, Appl No. 12880091.9"Multi-Axial Induction Borehole Imager," filed Jun. 29, 2012, 9 pgs.

Hardy, C. J., et al., "Calculated T1 Images Derived from a Partial Saturation-Inversion Recovery Pulse Sequence with Adiabatic Fast Passage," Magnetic Resonance Imaging, 1985, p. 107-116, vol. 3, No. 2, Pergamon Press Ltd., USA.

O'Donnell, M, et al., "Toward an automated analysis system for nuclear for nuclear magnetic resonance imaging. I. Efficient pulse sequences for simultaneous T1-T2 Imaging," Medical Physics, X002071925, vol. 13, No. 2, Mar./Apr. 1986, p. 182-190.

* cited by examiner

MULTI-AXIAL INDUCTION BOREHOLE IMAGER

CROSS-REFERENCE TO RELATED APPLICATIONS

This application is related to co-pending application serial no. PCT/US12/44931 titled "Full Tensor Micro-Impedance Imaging," which is hereby incorporated by reference.

BACKGROUND

Oil field operators demand access to a great quantity of information regarding the parameters and conditions encountered downhole. A wide variety of logging tools have been and are being developed to collect information relating to such parameters as position and orientation of the bottom hole assembly, environmental conditions in the borehole, and characteristics of the borehole itself as well as the formations being penetrated by the borehole. Among such tools are resistivity logging tools, which measure the electrical resistivity of a formation within a borehole. These tools cause electrical currents to flow within the formations to determine the formation's resistivity. A high resistivity measurement within a porous formation can indicate that hydrocarbons are present in the formation.

The electrical resistivity of a formation is generally anisotropic, i.e., the formation's resistivity will vary depending upon the orientation of an electrical current flowing through the formation. The measurements obtained by a resistivity logging tool may thus vary depending upon the orientation of the current induced in the formation and used by the tool to measure the formation's resistivity. Further, both macroanisotropy (i.e., anisotropy caused by differing formation layers) and micro-anisotropy (i.e., anisotropy caused by the grains that make up the material of each layer) may both be present. The micro-anisotropy of a given formation layer, however, may not be detectable by resistivity logging tools with measurement resolutions measured in feet or meters, rather than inches or centimeters. Such low resolution tools may thus not fully characterize the anisotropy of the formation at both a micro and a macro level, producing an incomplete and possibly misleading characterization of the formation.

BRIEF DESCRIPTION OF THE DRAWINGS

Accordingly, there are disclosed in the drawings and the following detailed description specific embodiments of multi-axial induction borehole imaging tools and methods. In the drawings.

Figures 1, 2:
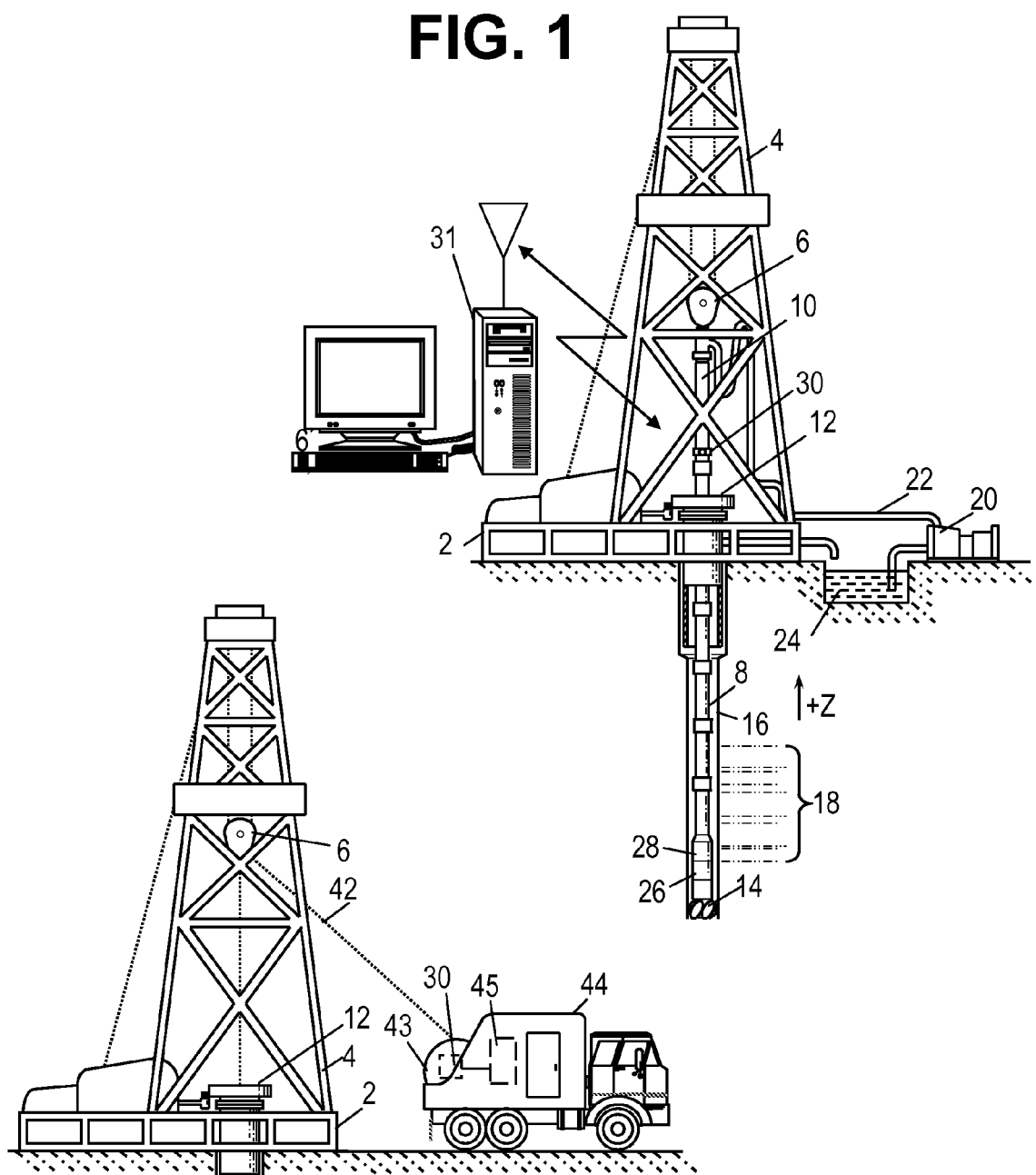
FIG. 1 shows an illustrative logging while drilling environment.
FIG. 2 shows an illustrative wireline logging environment.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The paragraphs that follow describe illustrative multi-axial induction borehole imaging tools and systems, as well as methods for using such tools and systems. Various environments suitable for the use of these tools, systems and methods are first described, followed by two example tools. The emitter/sensor pads of these tools are then functionally described, and specific inductive and galvanic transducer pad embodiments are subsequently described. Illustrative galvanic electrode configurations are also shown and described. An illustrative system, including both surface and downhole components, is then described together with the flow of data through the system that produces the imaging data. Examples illustrate how the imaging data may be presented as one or more graphical logs. Finally, an illustrative method for using the described tools and systems is described.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD tool 26 is integrated into the bottom-hole assembly near the bit 14. As the bit extends the borehole through the formations, logging tool 26 collects measurements relating to various formation properties as well as the tool orientation and various other drilling conditions. The logging tool 26 may take the form of a drill collar, i.e., a thick-walled tubular that provides weight and rigidity to aid the drilling process. A telemetry sub 28 may be included to transfer measurement data to a receiver within surface module 30, which forwards the data to computer system 31 for further processing. Telemetry sub 28 may also receive commands from surface module 30 originated from computer system 31. Data and/or commands may be transferred between surface module 30 and computer system 31 wirelessly (as shown), or via electrical conductors and/or optical cables (not shown).

At various times during the drilling process, the drill string 8 may be removed from the borehole as shown in FIG. 2. Once the drill string has been removed, logging operations can be conducted using a wireline logging tool 34, i.e., a sensing instrument sonde suspended by a cable 42 deployed from reel 43 and having conductors for transporting power to the tool and telemetry from the tool to the surface (as shown). A wireline logging tool 34 may have pads and/or centralizing springs (not shown) to maintain the tool near the axis of the borehole as the tool is pulled uphole. The pads may also house transducers used to determine at least some characteristics of the surrounding formation, as described in more detail below. A surface logging facility 44 collects measurements from the logging tool 34, and includes a surface module 30 coupled to spool 43 and a computer system 45 for processing and storing the measurements gathered by the logging tool. In at least some alternative embodiments, telemetry may be communicated between the tool and computer system 45 wirelessly (not shown).

Figure 3:
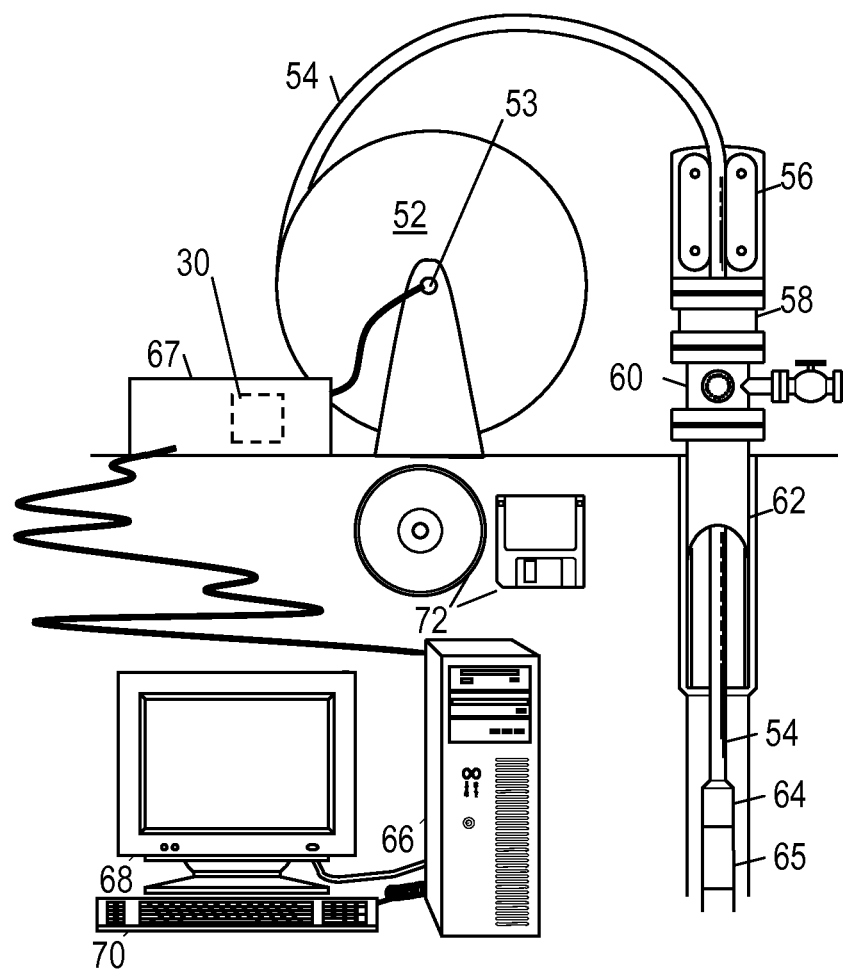
FIG. 3 shows an illustrative tubing-conveyed logging environment.

An alternative logging technique is logging with coil tubing. FIG. 3 shows an illustrative coil tubing-conveyed logging system in which coil tubing 54 is pulled from a spool 52 by a tubing injector 56 and injected into a well through a packer 58 and a blowout preventer 60 into the well 62. (It is also possible to perform drilling in this manner by driving the drill bit with a downhole motor.) In the well, a supervisory sub 64 and one or more logging tools 65 are coupled to the coil tubing 54 and optionally configured to communicate to a surface computer system 66 via information conduits or other telemetry channels (e.g. via electrical conductors, optical fibers, or wirelessly). An uphole interface 67 may be provided to exchange communications with the supervisory sub and receive data to be conveyed to the surface computer system 66.

Surface computer system 66 of FIG. 3 is configured to communicate with supervisory sub 64 during the logging process or alternatively configured to download data from the supervisory sub after the tool assembly is retrieved. Surface computer system 66 is preferably configured by software (shown in FIG. 3 in the form of removable storage media 72) to process the logging tool measurements. System 66 includes a display device 68 and a user-input device 70 to enable a human operator to interact with the system software 72.

In each of the foregoing logging environments, the logging tool assemblies preferably include a navigational sensor package that includes directional sensors for determining the inclination angle, the horizontal angle, and the rotational angle (a.k.a. "tool face angle") of the bottom hole assembly. As is commonly defined in the art, the inclination angle is the deviation from vertically downward, the horizontal angle is the angle in a horizontal plane from true North, and the tool face angle is the orientation (rotational about the tool axis) angle from the high side of the borehole. In accordance with known techniques, directional measurements can be made as follows: a three axis accelerometer measures the earth's gravitational field vector relative to the tool axis and a point on the circumference of the tool called the "tool face scribe line". (The tool face scribe line is typically drawn on the tool surface as a line parallel to the tool axis.) From this measurement, the inclination and tool face angle of the logging assembly can be determined. Additionally, a three axis magnetometer measures the earth's magnetic field vector in a similar manner. From the combined magnetometer and accelerometer data, the horizontal angle of the logging assembly can be determined. These orientation measurements, when combined with measurements from motion sensors, enable the tool position to be tracked downhole.

In these and other logging environments, measured parameters are usually recorded and displayed in the form of a log, i.e., a two-dimensional graph showing the measured parameter as a function of tool position or depth. In addition to making parameter measurements as a function of depth, some logging tools also provide parameter measurements as a function of rotational angle. Such tool measurements can be displayed as two-dimensional images of the borehole wall, with one dimension representing tool position or depth, the other dimension representing azimuthal orientation, and the pixel intensity, pattern or color representing the parameter value.

Figure 4A:
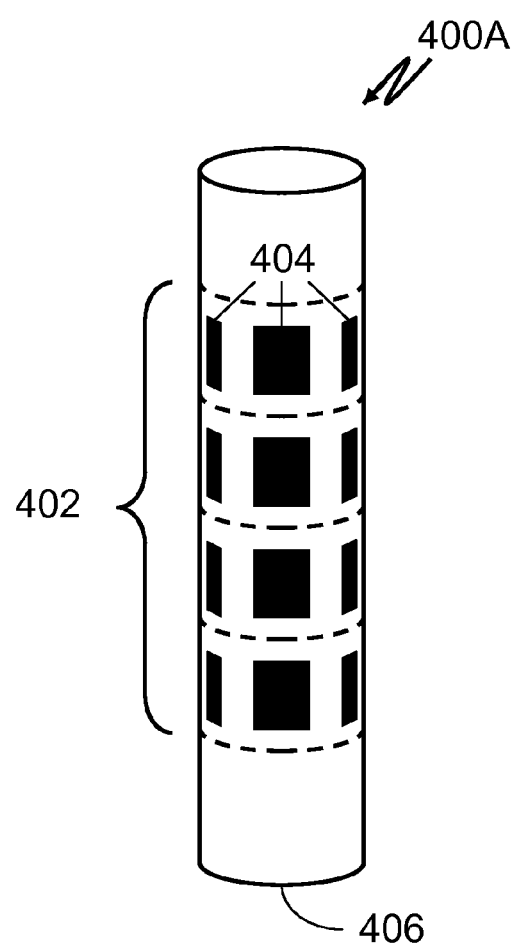
FIGS. 4A-4B show illustrative logging while drilling and wireline logging tools.
Figure 4B:
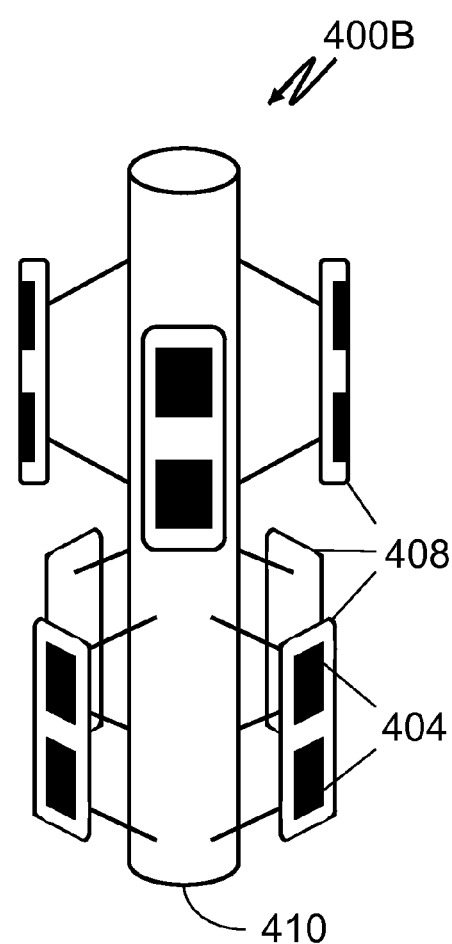

Among the measured parameters that may be presented as part of a log are resistivity measurements, which can include measurements that reflect the anisotropy of the borehole formation. Such measurements include, but are not limited to, vertical resistivity, horizontal resistivities in one or more directions, formation dip and formation strike. FIGS. 4A-4B show illustrative downhole tools suitable for taking such measurements. Illustrative LWD tool 400A (FIG. 4A) includes an array 402 of transducers 404. Each transducer 404 may include an emitter, a sensor or both, as well as additional structures and electronics as described in more detail below. The transducers 404 are positioned either inside cavities within drill collar 406 or embedded in non-conductive sections of the collar. Techniques for placing transducers on and within drilling pipes and collars are well known in the art and are not discussed further. Alternatively, an array 402 with fewer transducers 404 (e.g., a single vertical line of transducers) may be used, with the timing of measurements being arranged to exploit the drillstring's rotation to produce measurements at multiple azimuthal locations around the borehole as drilling proceeds.

FIG. 4B shows illustrative wireline logging tool 400B, which includes eight transducer pads 408. Each transducer pad includes transducers 404 similar to those used with LWD tool 400A. Transducer pads 408 are extended from the main body 410 of wireline logging tool 400B by standoffs that position transducer pads 408 near or against the borehole wall. This reduces the effect of the drilling fluid on the measurements and also provides better coupling between transducers 404 and the formation. Such improved coupling, together with a reduced spacing of transducers relative to other logging tools, helps to improve the sensitivity of the tool and the resolution of the log image produced.

Figure 5:
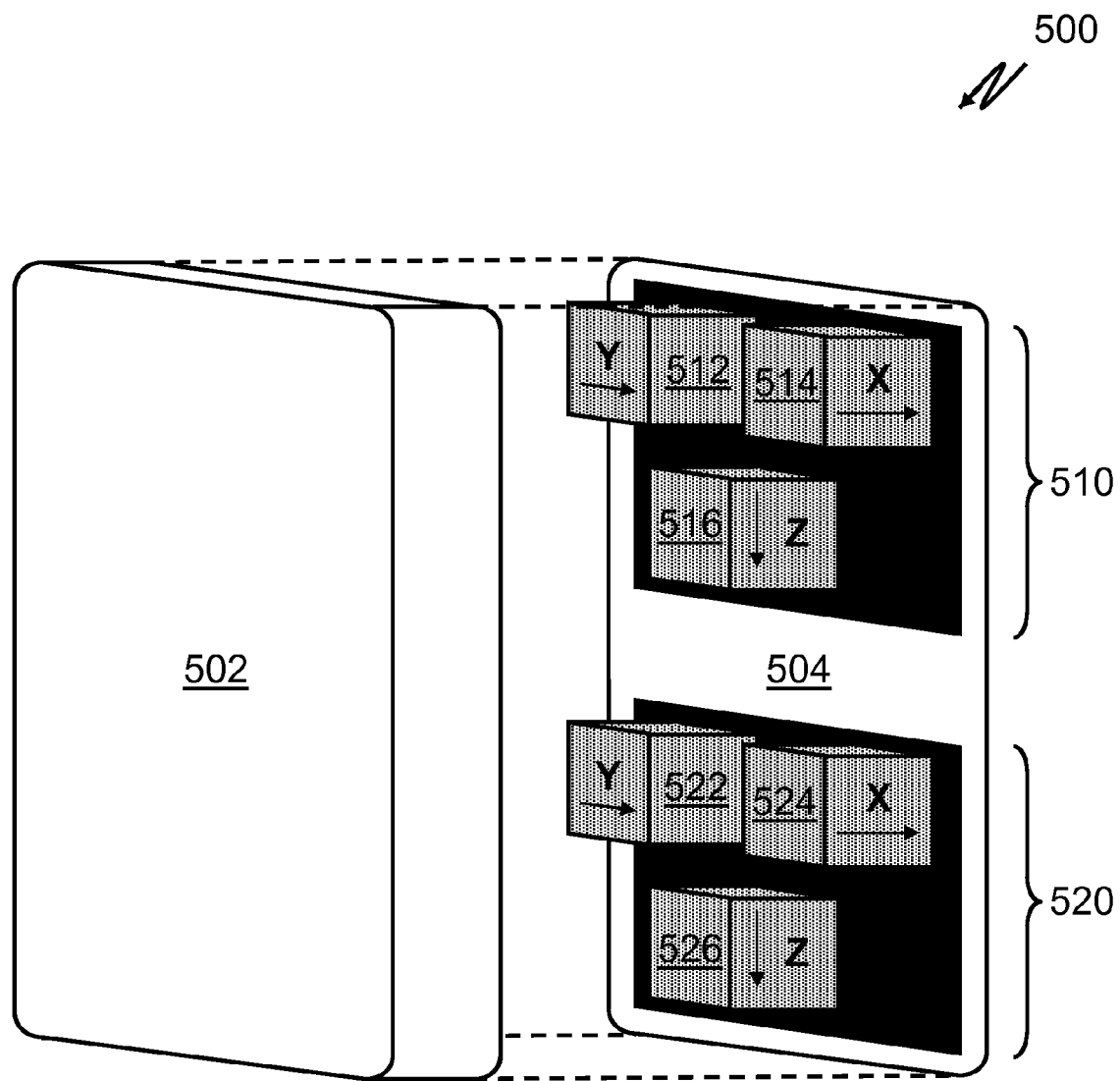
FIG. 5 shows an illustrative transducer pad.

FIG. 5 shows an illustrative transducer pad 500 with its rear cover 502 separated from its front face 504. The interior components of transducer pad 500 are shown in a simplified form for purposes of the discussion that follows. The illustrative components include an emitter transducer array 520 that includes emitters 522-526, and a sensor transducer array 510 that includes sensors 512-516. Each emitter transducer is configured and oriented to operate along a specific axis. Thus, for example, if emitter 526 is an inductive emitter, emitter 526 will produce a magnetic or B-field within the formation in front of transducer pad 500 with an orientation substantially along the Z axis (vertical). Similarly, each sensor transducer is also configured and oriented to operate along a specific axis. Thus, for example, if sensor 514 is an inductive sensor, sensor 514 will be most sensitive to B-fields within the formation with an orientation along the X axis (i.e., perpendicular to front face 504). These orientations of emitters and sensors also apply to the electric field orientations induced and sensed within the formation by capacitive emitters and sensors, and to the orientations of electric currents injected into and sensed within the formation by galvanic emitters and sensors. Although shown as separate elements for purposes of the present discussion, in at least some embodiments a single multi-axial emitter and a single multi-axial sensor may be implemented to emit and sense separable electric fields, magnetic fields or electrical currents in more than one direction.

Continuing to refer to FIG. 5, by configuring the emitters and sensors as shown it is possible to generate multiple sets of independent measurements, each set including multiple concurrent measurements. More specifically, the orthogonal configuration of the emitters and sensors shown allows three sets of three measurements each to be acquired for a given borehole depth and azimuth angle, generating nine samples organized as a 3×3 measurement tensor. It should be noted that the same concept can also apply for non-orthogonal sensors, as long as the excitations generated are linearly independent (i.e., non-coplanar). Non-orthogonality can be incorporated by including it in a forward model and an inversion process (both described in more detail below), or by synthesizing orthogonal signals by rotation and using the orthogonal processing algorithms. Each set can be generated by separately energizing and de-energizing each emitter in turn while acquiring concurrent samples from each of the three sensors for the time period during which each emitter is energized. An example of such a sequence is shown in FIGS. 6A through 6C, and graphed in FIG. 7.

Figure 6A:
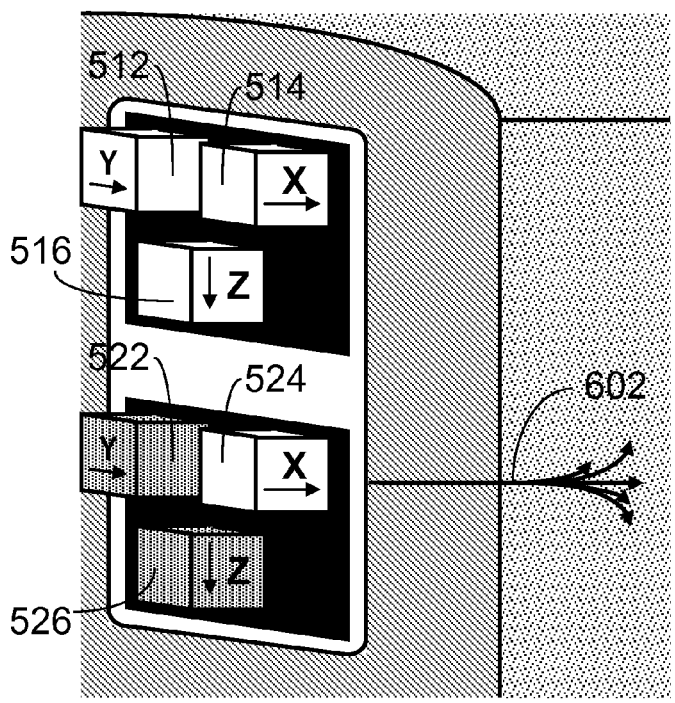
FIGS. 6A-6C show an illustrative sequencing of transducers.
Figure 6B:
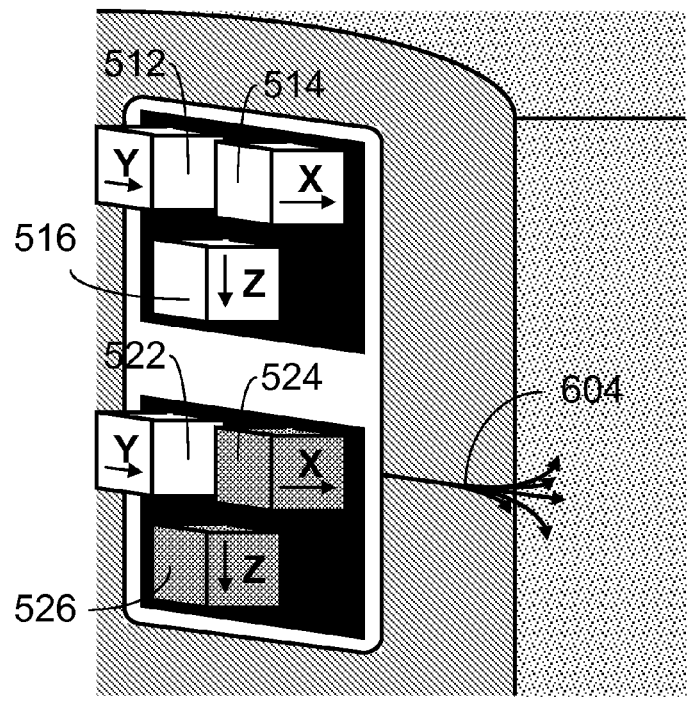
Figure 6C:
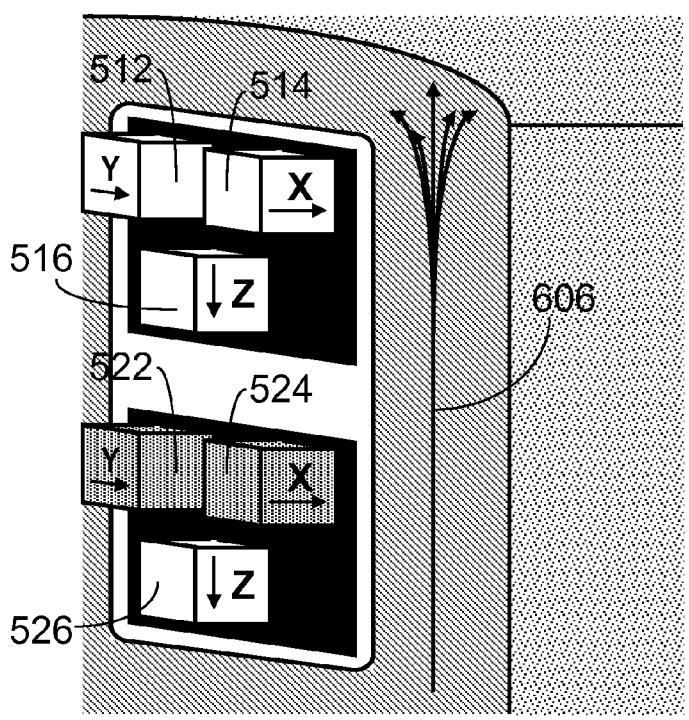
Figure 7:
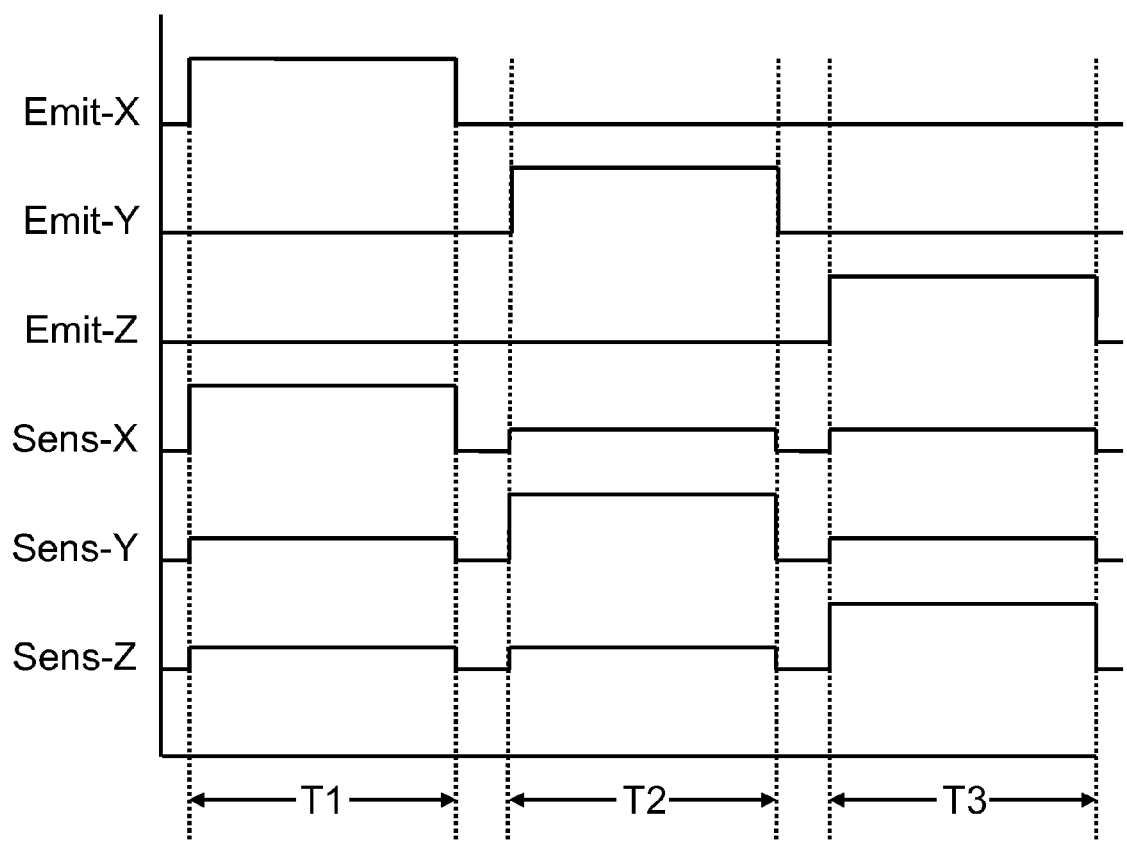
FIG. 7 graphs an illustrative sequencing of transducers.

In FIG. 6A, energized emitter 524 (shown highlighted) induces a time-variant B-field 602 within the surrounding formation primarily along the X axis. As B-field 602 extends into the anisotropic formation, it begins to curve in the other two directions, which does produce some components in the Y and Z directions. As a result, each of the three enabled sensors 512, 514 and 516 (also highlighted) detect a respective time-variant B-field along the X, Y and Z axes, each with differing magnitudes. This is reflected in the graph of FIG. 7 during sample period T1, wherein the B-field induced by the X emitter (Emit X) is detected primarily by the X sensor (Sens X), with detectable contributions measured by the Y and Z detectors (Sens Y and Sens Z). Once samples have been acquired during sample period T1, the X emitter is de-energized and the Y emitter is energized, as shown in FIG. 6B. This time a B-field 604 is induced that is oriented primarily along the Y axis. The resulting detected signals by the X, Y and Z sensors are shown in FIG. 7 during sample period T2. The sequence is again repeated along the Z axis to produce B-field 606 as shown in FIG. 6C, with the resulting detected signals shown in FIG. 7 during sample period T3.

The foregoing measurement technique employs a time-multiplexing principle to separate the effects of the various emitters. Other multiplexing principles would also be suitable, including frequency multiplexing and code-division modulation.

Figure 8:
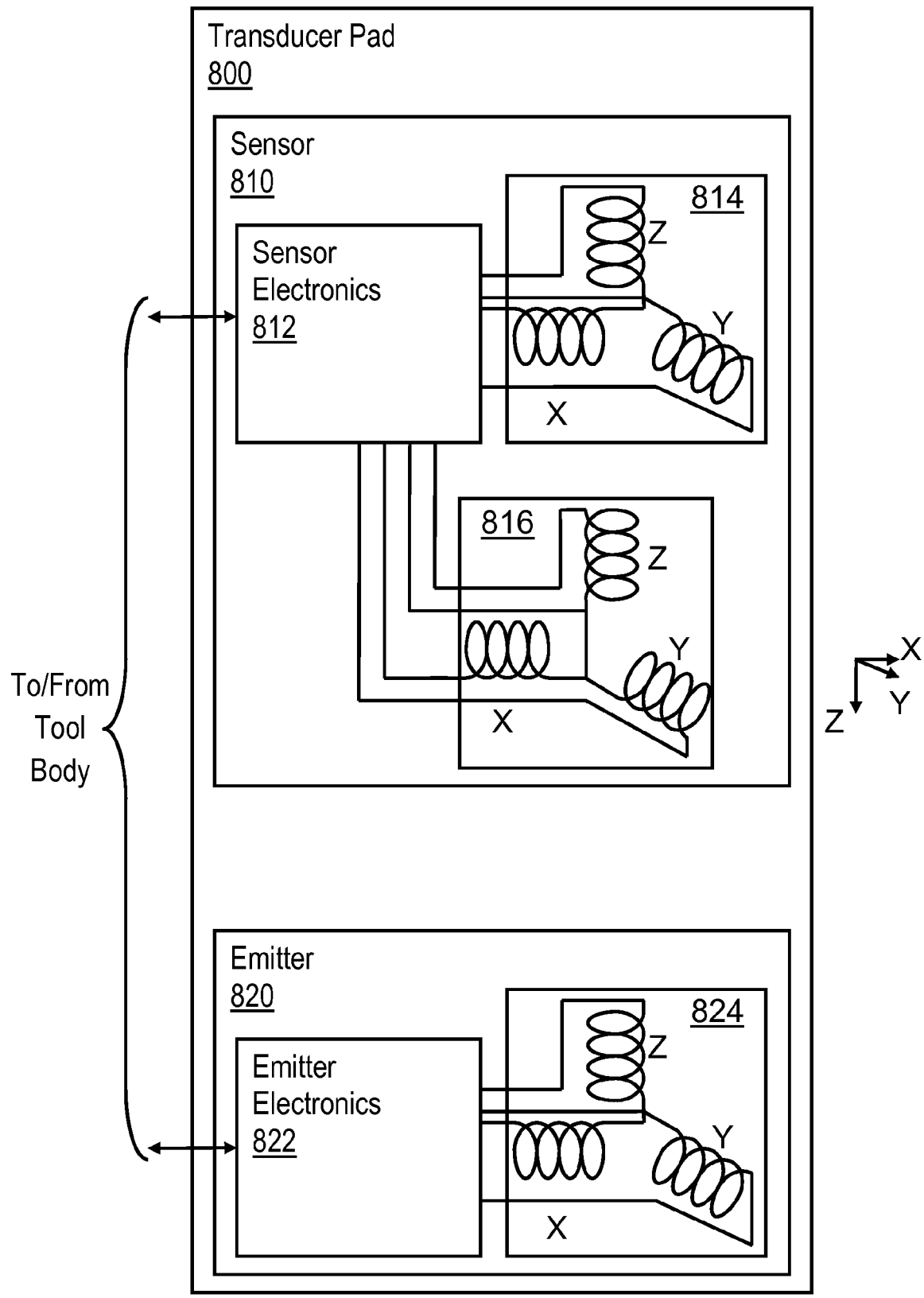
FIG. 8 shows an illustrative inductive transducer pad.

FIG. 8 shows an illustrative three-element multi-axial (i.e., triaxial) micro-inductive transducer pad 800 that operates as described above. Within emitter 820, emitter electronics module 822 couples to and drives each of the emitter coils 824 with an alternating current, under the control of other electronics and/or software within the tool body (not shown) to which emitter electronics module 822 also couples. The illustrated emitter coils are coupled to a common node and positioned such that the time-variant B-field produced by one emitter coil is orthogonal to the time-variant B-fields of the other two emitter coils. In at least some embodiments, two of the emitter coils are oriented such that their B-fields are parallel to the pad surface facing the borehole wall (or with their B-fields tangential to at least one common point on the pad surface for curved pads). Sensor electronics module 812 within sensor 810 is similarly coupled to each of sensor coils 814, and receives electrical signals from the sensor coils that are induced by the B-fields produced by emitter coils 824 within the formation. Each of the sensor coils 814 are also coupled to a common node and are also oriented orthogonally with respect to each other so as to match the orientations of the emitter coils along each of the X, Y and Z axes. Sensor electronics module 812 also couples to other electronics within the tool body and forwards the detected signals generated by sensor coils 814 to the tool body electronics for further processing.

It should be noted that although emitter 820 and sensor 810 are implemented using individual coils, those of ordinary skill will recognize that other structures and configurations such as, for example, dipoles and phased arrays may be suitable for use within the emitters and sensors described herein, and all such structures and configurations are within the scope of the present disclosure.

Continuing to refer to FIG. 8, within sensor 810, sensor electronics module 812 also couples to bucking coils 816, which are also oriented and coupled to each other in a manner similar to the coils within sensor 814. Each of sensor coils 816 is, however, wound in the opposite direction relative to the corresponding sensor coil 814, though their orientations are matched along each of the X, Y and Z axes. Bucking coils 816 are also positioned proximate to sensor coils 814 and between sensor coils 814 and emitter coils 824. Bucking coils 816 thus generate a signal for each orientation that is opposite in polarity from the corresponding signal from sensor coils 814. In at least some embodiments, the number of turns in each bucking coil is adjusted to account for the difference in the distances between bucking coils 816 and emitter coils 824 and the distances between sensor coils 814 and emitter coils 824. As a result, the signals produced by bucking coils 816 that are attributable to direct coupling with emitter coils 824 will cancel the signals produced by sensor coils 814 that are also attributable to direct coupling with emitter 824. Signals produced due to coupling through the formation between emitter coils 824 and both sensor coils 814 and bucking coils 816, however, will not cancel out and a difference signal representing the induced B-field in the formation will be produced from the combination of the corresponding sensor coil and bucking coil signals for each orientation (X, Y and Z). Those of ordinary skill in the art will recognize that many other techniques may be suitable for canceling and/or blocking the effect of direct coupling between emitter and sensor coils (e.g., electromagnetic shielding between the emitter and sensor coils), and all such techniques are within the scope of the present disclosure.

By mounting both the sensor coils 814 and the emitter coils 824 within transducer pad 800, and by canceling and/or blocking direct coupling between the sensor and emitter coils (e.g., by incorporating bucking coils 816 within the pad), it is possible to maintain a relatively small vertical spacing between the sensor and emitter coils and to increase the sensitivity of the logging tool. Sensor/emitter coils vertical spacings of one inch or less are possible with the tools, systems and methods described herein. Reductions in the vertical spacing between sensor and emitter coils produce a higher vertical resolution of the resulting borehole log. This is due to the fact that as the distance from the emitter decreases, the directionality of the relevant parameter (B-field, electric current, etc.) is more pronounced, i.e., the difference in magnitude of the primary parameter component relative to the other two orthogonal components increases, as shown in FIG. 7. This also increases the overall sensitivity of the tool. Increasing the differences in such measurement thus helps to uniquely identify properties such as electrical resistivity or conductivity and electrical permittivity (i.e., the overall formation impedance) at both a macro and micro level in specific directions with greater precision, and to thus produce a full measurement tensor such as the 3×3 measurement tensor previously described. Such a measurement tensor enables the electrical anisotropy of the surrounding formation to be characterized and quantified (e.g., by determining the micro-impedance of the surrounding formation in each of three orthogonal directions for each measurement sample). In at least some illustrative embodiments, the components of the tensor are expressed as complex values, wherein each complex value's real component indicates the formation's resistivity or conductivity and each complex value's imaginary component indicates the electric permittivity of the formation.

The above-described techniques for producing a 3×3 measurement tensor are not limited to transducer pads that incorporate inductive emitters and sensors. Transducer pads that incorporate capacitive emitters and sensors (not shown) may be configured and operated in a manner similar to the inductive emitters and sensors, wherein time-variant electric fields (E-fields) are induced into the surrounding formation in each of the three orthogonal directions and similar micro-impedance measurement samples are produced.

Figure 9:
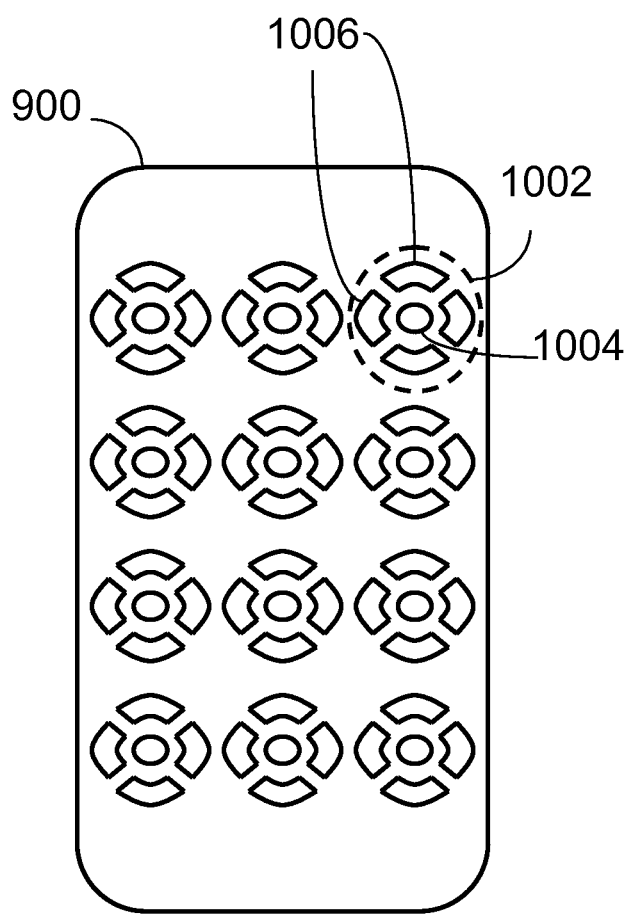
FIG. 9 shows an illustrative galvanic transducer pad.

Galvanic emitters and sensors may also be incorporated into a transducer pad, as shown in illustrative transducer pad 900 of FIG. 9. Transducer pad 900 (shown with the pad facing forward) includes dynamically configurable electrodes organized in an array. As shown, each electrode set 1002 includes a central electrode 1004 surrounded by one or more focusing electrodes 1006, and each set may be operated as either an emitter or a sensor. Alternatively, selected electrodes may be hardwired to suitable electronics as an emitter or sensor rather than being switched between emitter and sensor configurations. The dynamic configuration enables a greater flexibility, for example, in the number of directions in which current can be detected, thereby increasing the data suitable for use in an inversion to derive the localized formation tensor. The selected emitter electrodes provide a static or low frequency E-field (e.g., <100 Hz) to generate a localized current flow in the surrounding formation. The current can flow to a distant return electrode or between two selected emitter electrodes, and appropriate switching enables sufficient measurements to be obtained for the tensor inversion. The focusing electrodes can be enabled or disabled to vary the depth of penetration of the current into the formation, thereby providing additional measurements. The measurements obtained by the selected sensor electrodes may be voltage differentials or absolute voltages relative to the tool ground.

It should be noted that while the above embodiments are described within the context of wireline logging tool transducer pads that contact the borehole wall, the emitter and sensor configurations described may also be used with LWD tools such as that shown in FIG. 4A. In such LWD tool embodiments, the resistivity of the drilling fluid and the standoff distance between the transducers and the borehole wall can affect the sampled measurements, but both of these parameters may also be accounted for by the inversion process described in more detail below.

Figure 10:
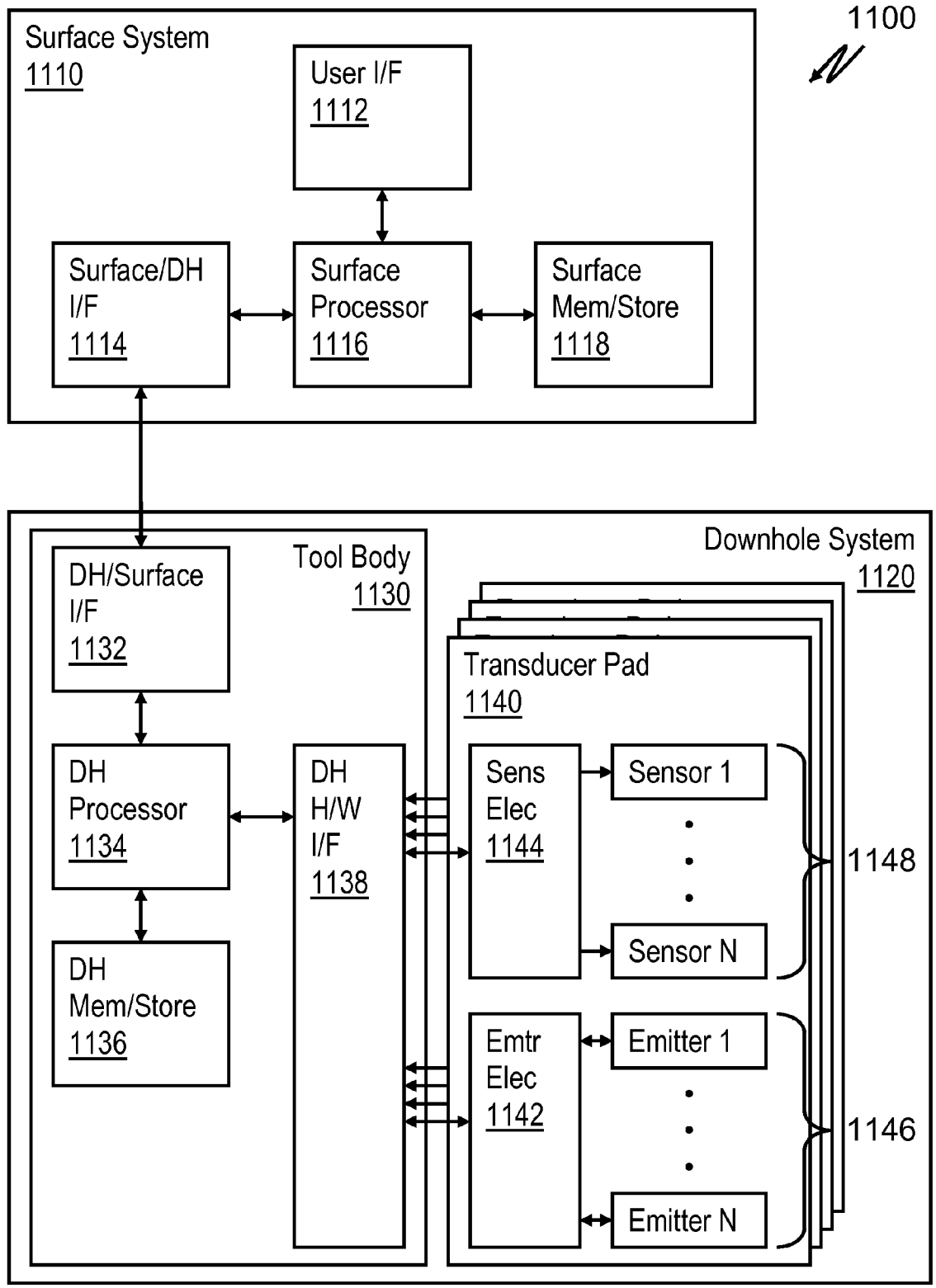
FIG. 10 shows an illustrative computer and data acquisition system.

As previously noted, emitter and sensor electronics modules within the transducer pad coupled to electronics within the tool body. The illustrative embodiment of FIG. 10 illustrates an example of an anisotropy imaging system 1100, and shows both the downhole system electronics (including the tool body electronics) and surface system electronics. Downhole system 1120 includes four transducer pads 1140 (similar to those already described) that each includes emitters 1146 coupled to emitter electronics module 1142, and sensors 1148 coupled to sensor electronics module 1144. The emitter and sensor electronics modules couple to and communicate with downhole hardware interface module 1138 within tool body 1130, which provides an interface between the transducer pads 1140 and downhole processor 1134.

Downhole processor 1134, which can include any of a wide variety of processors and/or processing subsystems, executes software that performs at least some of the control and data acquisition tasks associated with controlling and acquiring data from transducer pad 1140. The software executing on downhole processor 1134, as well as the acquired data, is stored on downhole memory/storage module 1136, which couples to downhole processor 1134 and can include any known data storage technology suitable for use in a downhole tool environment. Downhole processor 1134 also couples to downhole/surface interface module 1132, which in turn couples to surface/downhole interface module 1114 within surface system 1110 to provide a communication link between surface system 1110 and downhole system 1120.

Surface system 1110 includes surface processor 1116, which couples to user interface 1112, surface/downhole interface module 1114 and surface memory/storage module 1118. Surface processor 1116 executes software stored within surface memory/storage module 1118 that performs processing on the data provided by downhole system 1120 via surface/downhole interface module 1114. Surface memory/storage module 1118 may be any of a wide variety of memory and/or storage device, or combinations thereof, and provides both short-term (e.g., while the system is powered up) and long-term (e.g., during periods when the system is powered down) program and data storage. Data provided by downhole system 1120, as well as data processed by surface processor 1116, may be stored on surface memory/storage module 1118. User interface 1112 allows a user to interact with surface system 1110 (and overall with anisotropy imaging system 1100), providing both input devices suitable for entering commands (e.g., a mouse and keyboard) and output devices for displaying windows, menus and data to a user (e.g., displays and printers).

The data acquired by downhole system 1120 is processed to derive anisotropy data that can be presented to a user of system 1100. The processing is distributed between surface system 1110 and downhole system 1120, and the present disclosure does not limit how that distribution may be implemented. However, for purposes of describing the functionality of the processing, the illustrative embodiment presented performs the data acquisition and inversion operations described below within downhole system 1120, and data logging, presentation and long-term storage within surface system 1110.

Figure 11:
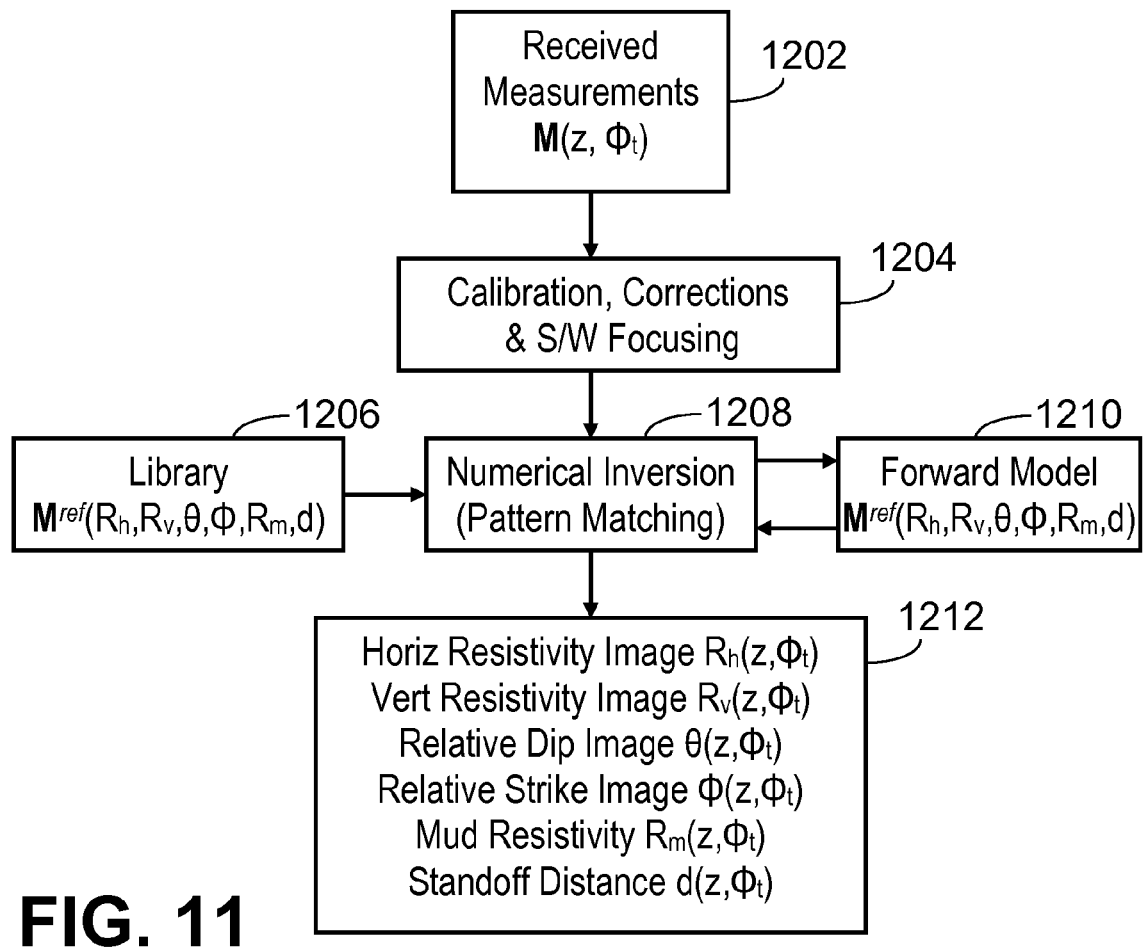
FIG. 11 shows an illustrative data flow for deriving anisotropy data.

As previously noted, each of the measurement samples processed by anisotropy imaging system 1100 can be represented by a measurement tensor $M(z,\Phi_t)$ with measurement tensor components $M_{ij}(z,\Phi_t)$. For each measurement tensor component, i={x, y, z} and represents the orientation of the active emitter when the measurement was taken, j={x, y, z} and represents the orientation of the sensor that performed the measurement, z is the borehole depth, and $\Phi_t$ is the azimuthal angle relative to the tool axis. The flow of the measurement tensor data as it is processed by anisotropy imaging system 1100 is shown in FIG. 11. A measurement tensor is received (block 1202) and the measurement tensor component values are adjusted to account for calibration and temperature corrections (block 1204). In some cases where the conductivity of the formation behaves linearly, it may also be possible to adjust the measured values (block 1204) to control the radial and vertical resolution of the measurements using software focusing filters. Such filtering can also reduce the effect of the borehole wall and the standoff of the tool from the borehole wall (e.g., when incorporated into an LWD tool). Software focusing is well known in the art and not discussed further.

Once the measurement tensor component values have been adjusted (block 1204) an inversion process is performed (block 1208) whereby the adjusted measurement tensor component values are iteratively compared against reference tensor component values from a library (block 1206) or against reference tensor component values produced by a forward model (block 1210). The formation parameters for the library and/or model reference tensor component values associated with the smallest tensor difference (described in more detail below) are provided to surface system 1110 as the formation parameter values associated with the depth and azimuth angle of the adjusted measurement tensor. Surface system 1110 then present the data to the user (block 1212) as, for example, the graphical logs of FIG. 12. The data and the logs may both be saved on surface memory/storage module 1118 for later retrieval and or additional processing. In at least some illustrative embodiments, a combination of a library lookup and a forward model calculation may be used. For example, comparisons with a library may be used to identify one or more parameter value ranges (horizontal and vertical resistivity, relative dip, relative strike, etc.), after which the model is iteratively applied over that range to identify modeled reference tensor component values that more closely match the adjusted measurement tensor component values.

The reference tensor component values provided by either a library or a forward model are compared against the adjusted measurement tensor component values by calculating a normalized tensor difference between an adjusted measurement tensor and a library-supplied or model-generated reference tensor. This different magnitude is iteratively computed for each reference tensor from the library or the model until a minimum difference magnitude is identified. The parameter values corresponding to the library/model reference tensor that produces the minimum difference magnitude are provided as the parameters of the formation corresponding to the borehole depth and azimuth of the adjusted measured tensor. In at least some illustrative embodiments this relationship is expressed as follows:

$$[R_h(z, \Phi_t), R_v(z, \Phi_t), \theta(z, \Phi_t), \Phi(z, \Phi_t)] = \\ \arg_{R_h, R_v, \theta, \Phi}\left[\min\left(\left|\frac{M_{ij}^{ref}(R_h, R_v, \theta, \Phi) - M_{ij}^{adj}(z, \Phi_t)}{M_{zz}^{ref}(R_h, R_v, \theta, \Phi)}\right|\right)\right] \quad (1)$$

where,
$R_h$ is the horizontal resistivity;
$R_v$ is the vertical resistivity;
$\theta$ is the relative dip (to the tool);
$\Phi$ is the relative strike (to the tool);
$\Phi_t$ is the tool measurement azimuth;
z is the borehole depth;
$M_{ij}^{ref}$ is the reference tensor component ij (library or model);
$M_{ij}^{adj}$ is the adjusted measurement tensor component ij;

i is the tensor component orientation index {x, y, z} of the emitter; and j is the tensor component orientation index {x, y, z} of the sensor.

As previously noted the indices indicate the orientations of the active emitter when the measurement was taken and of the sensor providing the measurement. Thus, for example, $M_{zz}^{ref}$ represents a reference measurement for an active emitter and a sensor both oriented in the z direction (here used for normalization). Similarly, $M_{xy}^{adj}$ is an adjusted measurement taken by a sensor oriented along the y axis while an emitter oriented along the x axis was active. Measurements can include, but are not limited to, voltage, current, magnetic field strength and electric field strength. For example, in the embodiment of FIG. 8, voltage measurements may be provided by each of the sensor coils 814 and compared against similar reference voltage measurements.

It should be noted that to fully characterize the anisotropy of the borehole measurements, both the tool measurement azimuth $\Phi_t$ as well as the formation strike $\Phi^{abs}$ with respect to earth are needed. In at least some illustrative embodiments the formation strike $\Phi^{abs}$ is derived from the tool measurement azimuth $\Phi_t$ and the relative formation strike $\Phi$ using the following conversion equation:

$$\Phi^{abs}(z,\Phi_t)=\Phi(z,\Phi_t)-\Phi_t \quad (2)$$

Also, additional parameters may be included in and provided by the library and/or the model. Such parameters may include, for example, the standoff distance between the transducer pad and borehole wall and the mud resistivity for embodiments where the emitters and sensors do not contact the wall.

The dielectric constant of the formation may also be included in and provided by the library and/or model through the use of multiple measurements taken at different frequencies. At lower frequencies the response is primarily due to the resistivity of the formation, while at higher frequencies the response is primarily due to the reactance of the formation. In at least some embodiments, additional measurements are made in various directions as before but at multiple frequencies, enabling the anisotropy of the dielectric constant to also be characterized. This characterization may be derived from either a second separate measurement tensor that includes the additional measurements for each sample at a given azimuth and depth, or from a single higher order measurement tensor that includes sufficient components to derive both the electrical resistivity and permittivity anisotropy of the formation. Anisotropic resistivity and dielectric values may also be converted into properties of individual layers that make up laminations present in the formation. For example, horizontal resistivities, vertical resistivities, dielectric constants and their volumetric ratios may be used to identify shale and sand layers. Because the systems and methods described enable the measurements to be resolved into at least three orthogonal directions (e.g., two horizontal and one vertical), more complex laminations and formations may be identified and characterized.

Figure 12:
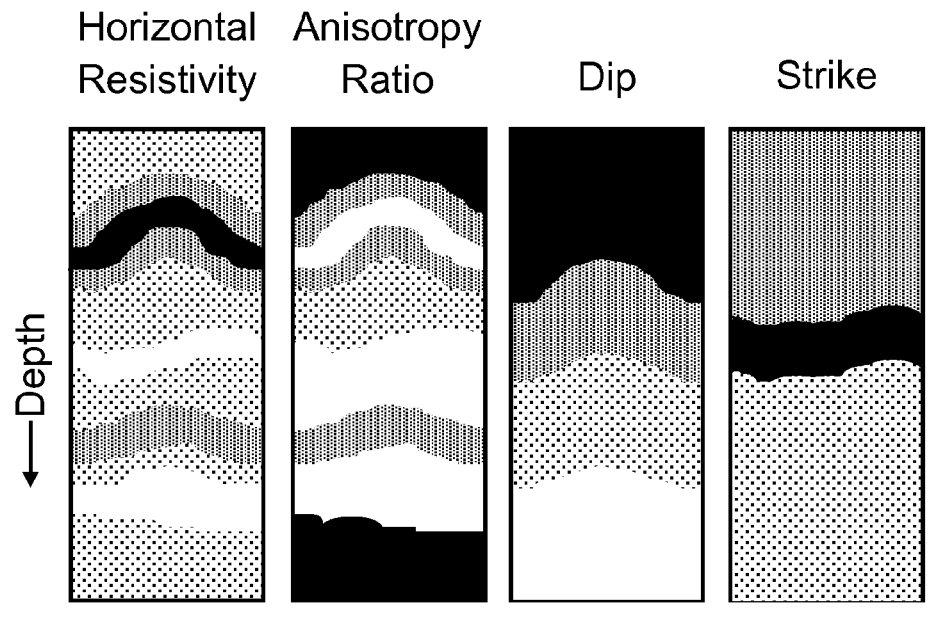
FIG. 12 shows an illustrative set of graphical borehole logs.
Figure 13:
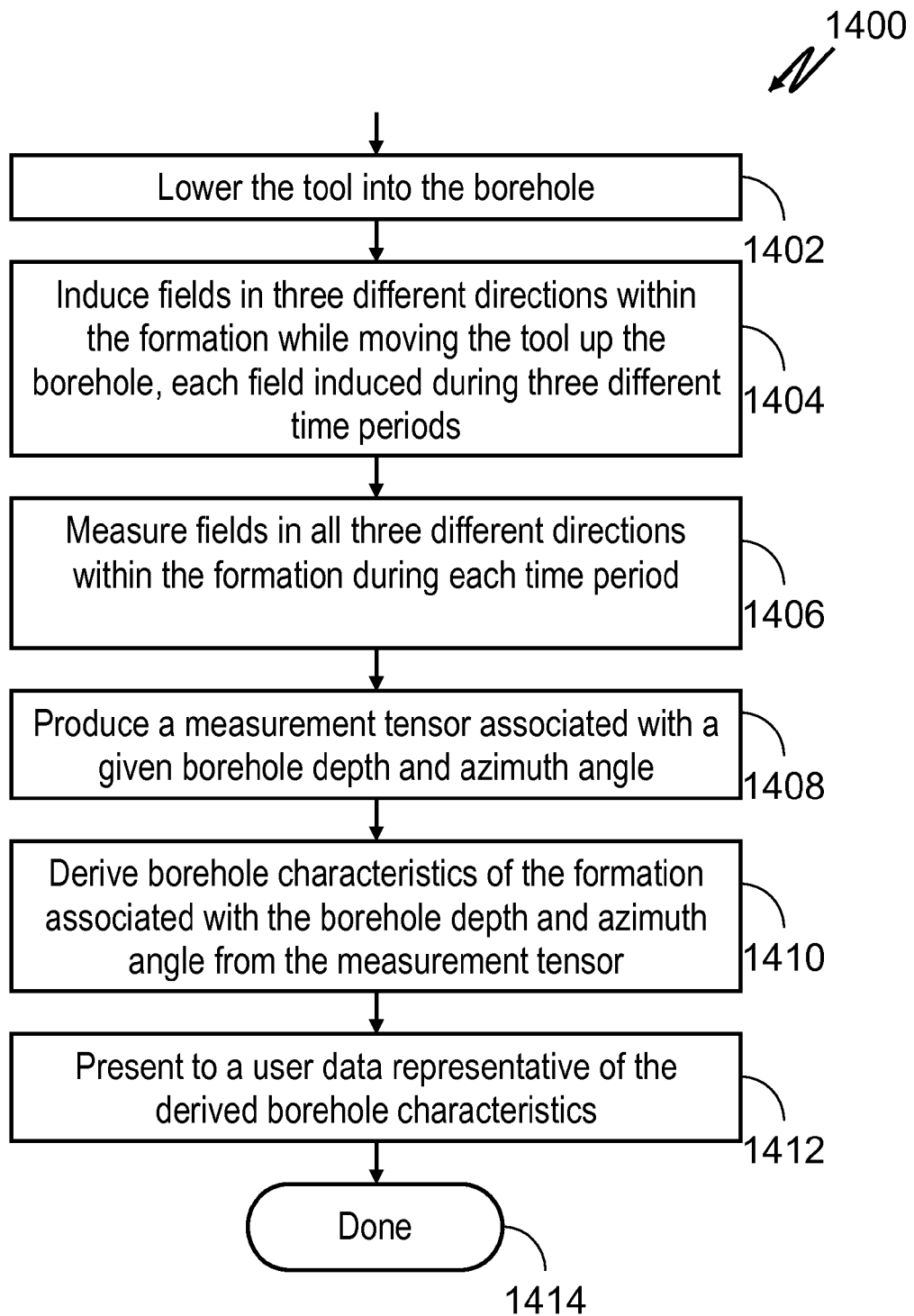
FIG. 13 shows an illustrative method for operating an electrical anisotropy borehole imaging system.

FIG. 13 shows an illustrative method for using the tools and systems described above. An illustrative borehole imaging tool is lowered into the borehole (block 1402), and as it is pulled back up the borehole, the tool periodically induces fields in three different directions within the formation for a given depth and azimuth angle, each field induced during three separate time periods (block 1404). During each time period, field measurement samples are taken in all three directions (block 1406). The measurements may be electric field measurements or magnetic field measurements (or both), and may be expressed either directly as field strength measurements or indirectly as corresponding electrical current or electric potential measurements. A measurement tensor is produced (e.g., a 3×3 voltage measurement tensor) that is associated with a given borehole depth and tool azimuth angle (block 1408). The borehole characteristics at the given depth and azimuth angle are derived from the measurement tensor (block 1410) by using, for example, the inversion process described above. The derived data is then presented to a user of the tool (block 1412), ending the method (block 1414). FIG. 12 (previously described) shows an illustrative example of the types of two-dimensional log formats that can be used to present the data to a user.

Numerous other modifications, equivalents, and alternatives will become apparent to those skilled in the art once the above disclosure is fully appreciated. For example, although three orthogonal emitters and sensors are used in a triaxial configuration in the embodiments described, different numbers of emitters and/or sensors may also be used, and such emitters and/or sensors may be configured in a non-orthogonal orientation. Also, additional focusing and guard rings may be added to the galvanic transducer pads described to provide additional control over the direction of the current flowing through the formation to/from such transducer pads. Further, although each type of emitter and sensor (galvanic, capacitive and inductive) was discussed individually, at least some embodiments combine several of these into a single instrument and include combined concurrent measurements within the measurement tensors. The programmable downhole processor is just one example of a suitable downhole controller, and it could be replaced or augmented with an integrated or hardwired controller. It is intended that the following claims be interpreted to embrace all such modifications, equivalents, and alternatives where applicable.

What is claimed is:

1. A multi-axial induction borehole imaging tool that comprises:
    inductive emitters that sequentially induce, at azimuthally-spaced positions on a borehole wall, a plurality of fields having components in three non-coplanar directions within a formation;
    directionally sensitive inductive sensors that concurrently sense the components caused by each of the inductive emitters; and
    a downhole controller that processes signals received from the directionally sensitive inductive sensors to provide a plurality of measurement sets, wherein each measurement set is representative of an impedance tensor at each of said azimuthally-spaced positions on the borehole wall.

2. The tool of claim 1, which further comprises:
    one or more bucking coils each positioned between an inductive sensor of the one or more inductive sensors and an inductive emitter of the one or more inductive emitters;
    wherein the components each comprise a directly coupled component and a formation coupled component; and
    wherein each bucking coil generates a second signal that substantially cancels a portion of signals received from the inductive sensor and representative of the directly coupled component.

3. The tool of claim 1, wherein at least one of the one or more inductive sensors is vertically spaced away from at least one of the one or more inductive emitters by less than or equal to one inch.

4. The tool of claim 1, wherein the one or more inductive emitters comprise three orthogonal coils.

5. The tool of claim 1, wherein the one or more inductive sensors comprise three orthogonal coils.

6. The tool of claim 1, wherein the impedance tensor indicates one or more electrical anisotropy characteristics of the formation.

7. The tool of claim 1, wherein the impedance tensor comprises a 3×3 tensor.

8. The tool of claim 1, wherein said plurality of fields are electrical fields.

9. The tool of claim 1, wherein said plurality of fields are magnetic fields.

10. A multi-axial induction borehole imaging system that comprises:
    a tool body that moves along a borehole through a formation with one or more transducer pads to measure a formation impedance tensor as a function of borehole depth and azimuth angle on the borehole wall, wherein each transducer pad comprises a set of inductive emitters and sensors that respectively sequentially induce and concurrently sense fields within the formation, wherein the inductive sensors provide signals representative of three linearly-independent directional components of the one or more fields;
    a downhole controller that processes the signals to provide a plurality of measurement sets, wherein each measurement set is representative of an impedance tensor at the borehole depth and azimuth angle at which each measurement set is acquired; and
    a computer system that receives and derives from the measurement sets one or more formation characteristics associated with each borehole depth and azimuth angle and further presents to a user data representative of at least one of the one or more formation characteristics.

11. The system of claim 10, wherein the transducer pads are embedded in the tool body.

12. The system of claim 10, wherein the transducer pads couple to and extend away from a central portion of the tool body towards the borehole wall.

13. The system of claim 10, wherein the controller further derives a mud resistivity and a standoff distance between each of the one or more transducer pads and the borehole wall for each borehole depth and azimuth angle.

14. The system of claim 10, wherein operation of a first grouping of the one or more inductive emitters and the one or more inductive sensors is multiplexed with operation of a second grouping of the one or more inductive emitters and the one or more inductive sensors.

15. The system of claim 14, wherein the operations of the first and second groupings are multiplexed using a multiplexing technique selected from the group consisting of time division multiplexing, frequency division multiplexing and code division multiplexing.

16. The system of claim 14, wherein the first and second groupings share at least one common inductive sensor.

17. A multi-axial induction borehole imaging method that comprises:
    lowering a multi-axial induction borehole imaging tool into a borehole through a formation;
    at each of multiple azimuthal angles on the borehole wall, inductively and sequentially inducing fields having three linearly-independent directional components within a formation;
    inductively detecting the directional field components, using sensors that concurrently sense the components of each field, to obtain a plurality of measurement sets, wherein each measurement set is a function of azimuthal angle and depth in the borehole and is further representative of an impedance tensor;

deriving from the measurement sets one or more formation characteristics as a function of the azimuthal angle and depth in the borehole; and presenting to a user data representative of at least one the one or more borehole characteristics.

18. The method of claim 17, further comprising:

inductively detecting a directly coupled component of each of the directional field components;

combining a signal representative of the inverse of each directly coupled component with a signal representative of each corresponding directional field component, producing one or more difference signals; and deriving the measurements from the one or more difference signals.

19. The method of claim 17, wherein the one or more formation characteristics comprise a characteristic selected from the group consisting of a vertical formation resistivity, one or more horizontal formation resistivities, a formation dip, and a formation strike.

20. The method of claim 19, wherein the formation strike is derived from the measurement azimuth and relative formation strike using: $\varphi^{abs}(z,\varphi_t)=\varphi(z,\varphi_t)-\varphi_t$.

21. The method of claim 17, wherein the impedance tensor comprises a 3×3 tensor.

* * * * *